(12) United States Patent
Yang et al.

(10) Patent No.: US 10,362,300 B2
(45) Date of Patent: Jul. 23, 2019

(54) THREE DIMENSIONAL CONTENT PROJECTION

(71) Applicant: Disney Enterprises, Inc., Burbank, CA (US)

(72) Inventors: Bei Yang, San Francisco, CA (US); Przemyslaw Iwanowski, North Hollywood, CA (US)

(73) Assignee: Disney Enterprises, Inc., Burbank, CA (US)

( * ) Notice: Subject to any disclaimer, the term of this patent is extended or adjusted under 35 U.S.C. 154(b) by 234 days.

(21) Appl. No.: 15/042,646

(22) Filed: Feb. 12, 2016

(65) Prior Publication Data

US 2017/0237975 A1    Aug. 17, 2017

(51) Int. Cl.
*H04N 13/366* (2018.01)
*H04N 13/398* (2018.01)
*H04N 9/31* (2006.01)

(52) U.S. Cl.
CPC ......... *H04N 13/366* (2018.05); *H04N 9/3185* (2013.01); *H04N 9/3194* (2013.01); *H04N 13/398* (2018.05)

(58) Field of Classification Search
CPC ............. H04N 13/0468; H04N 9/3179; H04N 13/0497; H04N 13/366; H04N 13/398; H04N 9/3194; H04N 9/3185

USPC .......................................................... 348/51
See application file for complete search history.

(56) References Cited

U.S. PATENT DOCUMENTS

| | | | | |
|---|---|---|---|---|
| 6,554,431 | B1* | 4/2003 | Binsted | H04N 5/74 348/E5.137 |
| 2008/0316432 | A1* | 12/2008 | Tejada | G03B 17/54 353/28 |
| 2010/0253700 | A1* | 10/2010 | Bergeron | G03B 35/00 345/633 |
| 2011/0285854 | A1* | 11/2011 | LaDuke | G01S 11/00 348/169 |
| 2015/0348326 | A1* | 12/2015 | Sanders | G06T 19/006 345/633 |

\* cited by examiner

*Primary Examiner* — William C Vaughn, Jr.
*Assistant Examiner* — Jae N Noh
(74) *Attorney, Agent, or Firm* — Dorsey & Whitney LLP

(57) ABSTRACT

The present application relates generally to a projection system and method for projecting content onto a moving performer. In one embodiment, the system includes a projector that projects light onto the performer, a position sensor, such as a camera and/or depth sensor that captures position information about the performer, and a computer that modifies original content based on the position information of the performer. The computer uses the position information to generate a mask, such as a silhouette, of the performer, and then modifies the original content based on the mask of the performer. The modified content is then projected by the projector onto the performer.

18 Claims, 8 Drawing Sheets

THREE DIMENSIONAL CONTENT PROJECTION

FIELD

The present disclosure relates generally to systems and methods for projecting content onto moving objects, actors, or characters.

BACKGROUND

Performances and entertainment attractions often use projection systems to project content onto objects as part of the performance and/or to enhance the aesthetics of the objects, scenery, etc. For example, during a performance, a blank object may be transformed into a mysterious cave through the use of projected content. In some instances it may be desirable to project content onto a moving object, such as an actor or character that is moving across the stage or other performance area. Conventional projection systems use two dimensional tracking of a moving object and use the two dimensional information to project content onto the object. These systems allow content to be projected in a single area, but the content does not appear to "stick to" or move with the object. Accordingly, most of these systems produce effects such as an object walking through a colored object (e.g., a painting) but cannot replicate an effect of a content formed on the moving object, such as a projected logo that moves with and changes in appearance based on the orientation of the moving object. The present disclosure includes techniques and systems for improving the content projection allowing different types of effects and more realistic content projection than conventional systems.

SUMMARY

One embodiment of the present disclosure may take the form of a projection system and method for projecting content onto a moving performer. In one embodiment, the system includes a projector that projects light onto the performer, a position sensor, such as a camera and/or depth sensor that captures position information about the performer, and a computer that modifies original content based on a location of the performer. The computer uses the position information to generate a mask, such as a silhouette, of the performer, and then modifies the original content based on the mask of the performer. The modified content is then projected by the projector onto the performer.

Another embodiment of the present disclosure includes a method for modifying an image projected onto a moving performer. The method includes receiving, by one or more processing elements, an original image and positional data corresponding to the performer and constraining by one or more processing elements the original image by a mask. The mask corresponds to at least one of the locations or the orientation of the performer.

Another embodiment of the present disclosure includes a method for projecting content onto a performer. The method includes generating by a processing element a mask based on a position of the performer, masking a projection area of the content based on the mask, and projecting by the projector the masked content onto the performer.

SPECIFICATION

The present disclosure is related to a system and method for projecting content onto moving objects, such as moving actors, and allowing the content to move with and change based on changes in location and orientation of the moving object. The system utilizes three dimensional (3D) tracking to track the movement of the object and modify the content according. Additionally, to increase the computation speed the system uses two dimensional (2D) information to modify the content (such as via a masking operation), which conceals latency, 3D tracking errors, or the like, in the projected content.

The system includes a 3D sensor or sensors that capture the movement and pose of the object, a 2D camera that captures 2D information of the object, one or more computers for combining the 3D and 2D information together and generating or modifying the content, and a projector for projecting the content modified by the 3D and 2D information. For example, the 2D information can be used to generate a 2D silhouette mask of the object and because the mask is limited to 2D, the mask can be generated more quickly and with fewer errors as compared to the 3D tracking data of the object. The content is then modified by the computer based on the 3D information and prior to projection onto the object; the 2D silhouette masks the content to define a projection boundary (or rendering boundary) for the content. In other words, the 2D silhouette prevents the content from being projected onto areas outside of the silhouette boundary of the object. Thus, any errors or latency in the 3D position can be hidden from the viewer.

Figure 1A:
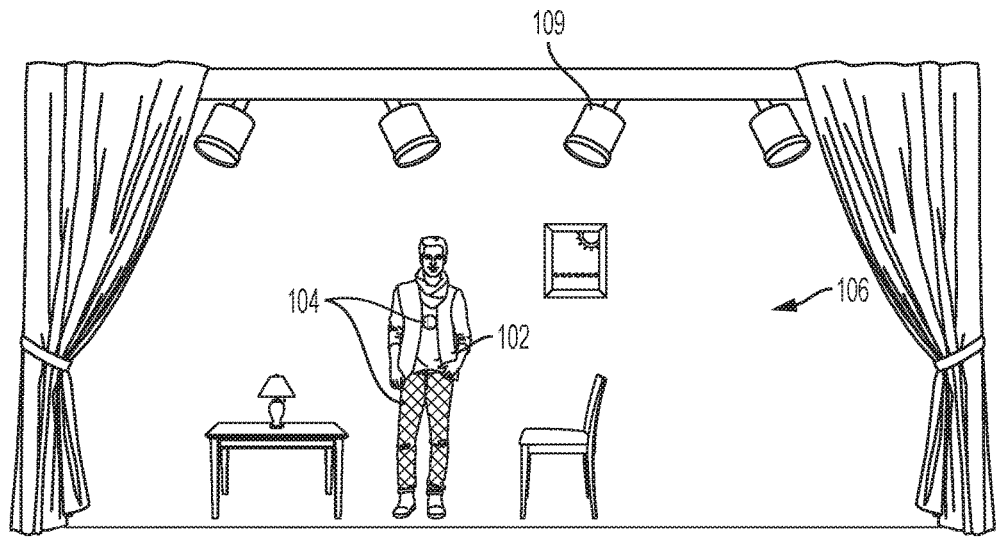
FIG. 1A is a front elevation view of a performance area with a performer.
Figure 1B:
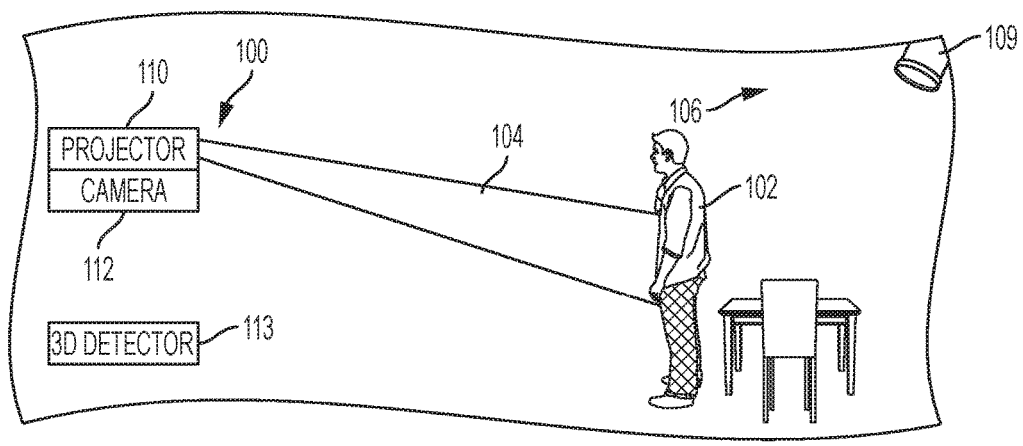
FIG. 1B is a side elevation view of the performance area of FIG. 1A illustrating a system for projecting content onto the performer.

A system 100 for implementing the method of the present disclosure is shown in FIGS. 1A and 1B. The projection system 100 projects content 104 onto a performer 102 as the performer moves across the projection environment 106, such as a stage or other area. The projection system 100 modifies the content 104 based not only on a desired aesthetic appearance, but also based on changes in orientation and location of the performer 102 relative to the location of the projection system 100. For example, the content 104 is changed to accommodate movement, such as when the performer 102 moves from facing directly towards the projection system 100 to facing at an angle relative to the projection system 100, or moves his or her arms, legs, etc. Modifying the content based on the orientation and location of the performer 102 helps to ensure that the content appears as desired, regardless of changes of the performer 102 and so that the content will appear more realistic and appear to be formed with or "stuck to" the performer. For example, it may be desirable for the content 104 to appear to be formed on the performer 102 (e.g., as a skin, graphic on clothing, or the like) and to maintain this appearance, the content needs to change along with changes of the performer 102. Further, the system helps to prevent "blow-by" projection where the content is projected onto a background object, rather than the performer, due to movement or a miscalculation by the projector.

The projection system 100 tracks movement of the performer 102 in the projection environment 106 and uses a combination of 3D and 2D information about the performer 102 to ensure that the content is projected only in the locations desired (e.g., not behind the performer 102) and that the content is properly modified to adjust to the orientation of the performer 102.

Figure 2:
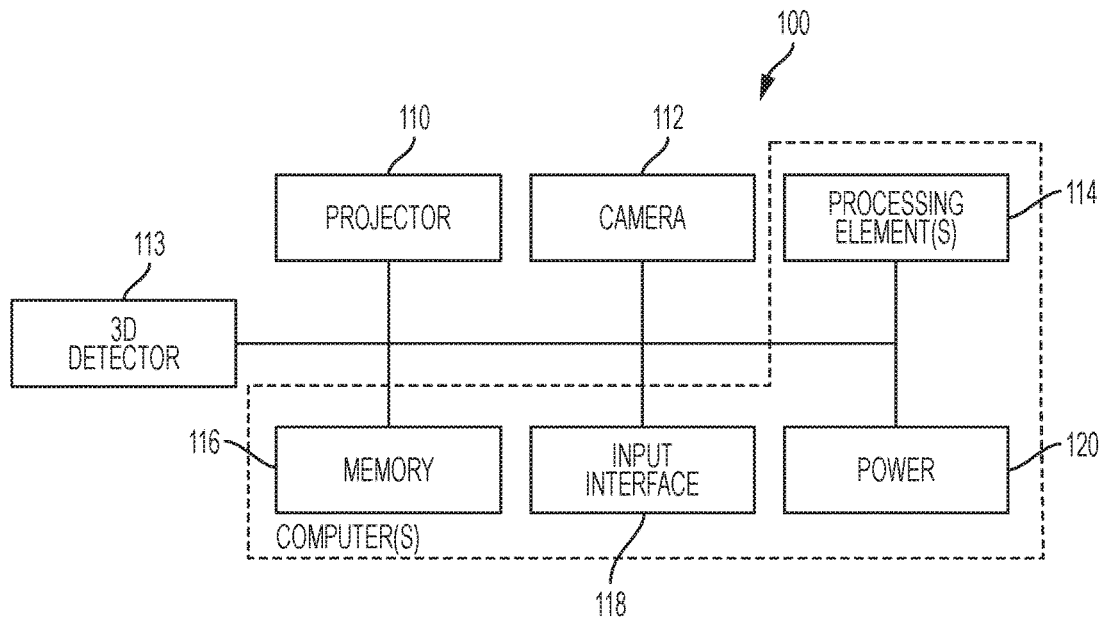
FIG. 2 is a simplified block diagram of the system of FIG. 1B.

FIG. 2 is a simplified block diagram of the projection system 100. The projection 100 system includes a projector 110, a camera 112 for capturing 2D data, a 3D detector 112, one or more processing elements 114, memory 116, a input/output interface 118, and a power component 120. It should be noted that some or all of the components may be integrated into a single system or separated into multiple systems. For example, the projector 110 and camera 112 may be standalone devices with their own input/output interfaces that communicate with two or more computers that contain the processing elements 114. Alternatively, the system 110 can be integrated into a single device that includes each of the components. As another example, a single device can be used to capture the 2D and 3D information, such as a 3D camera or other types of depth and light sensors.

The projector 110 projects content onto a projection area or surface, such as onto the performer 102. The projector 110 includes a lens and a light source for emitting light. The light source may vary depending on the type of projector 110 used, examples include, light emitting diodes, incandescent bulbs, halogen lights, laser diodes, and other types of coherent or incoherent light elements. Similarly, the lens can be varied based on the desired applications or projection effects. The projector 110 may also include a communication interface, such as a WiFi, Ethernet, Bluetooth, or other communication mechanism that allows the projector 110 to receive data from one or mot devices.

The camera 112 captures information regarding the projection area 106, the performer 102, and the content 104 projected by the projector 100. The camera 112 typically includes one or more image sensors, processing elements, memory, and the like, and is configured to be in communication with the projector, the processing elements 114, and other elements of the system 100 as needed. In many embodiments, the camera 112 is configured to capture 2D information, but in other embodiments the camera 112 can capture both 2D and 3D information. Additionally, the camera 112 may capture non-visible light wavelength information, such as infrared and ultra violet wavelengths. It also desirable that the camera 112 have a high frame rate, such as over 700 frames per second, to help reduce latency in the system. As one example, the Bonito CL-400 camera by Allied Vision can be used that has around 200 frames per second speed. However, other types of cameras can be used and the above is just one type of camera that can be used.

In many embodiments, the camera 112 and the projector 100 are arranged co-nodally such that the camera 112 will capture the performer 102 from the same vantage point as the projector 110 is projecting the content onto the performer. Various techniques for optical co-nodal location can be used. For example, the camera can be mounted on a side of the projector and by using a beam splitter and mirrors angled at 45 degrees, the images captured by the camera 112 reflect the nodal location of the projector 110. Alternatively, post processing algorithms that modify the data from the camera or projector to match the nodal location of the other component or other optics techniques for nodal location can be used in applications that can tolerate some latency.

The 3D detector 113 detects 3D information about the performer 102 and optionally the performance area 106. The 3D detector 113 can be substantially any type of device or groups of devices that interact to capture depth information. For example, the 3D detector 112 may be a marker or markerless 3D detection system. Examples of markerless systems include components that utilize structured light, focus data, stereo data, acceleration, etc. Examples of marker-based systems utilize external elements, such as tracking elements attached to the performer or scenic objects, external sensors, or the like. Reflective or passive marking elements that assist the 3D detector 113 by reflecting certain wavelengths (e.g., visible or IR light waves) can be attached to the performer, which increases the recognition of the depth and assists to identifying discrete locations of the performer 102. As another example, active marking balls or elements, such as light emitting diodes, can also be used to allow the detector 113 to track the performer 102. It should be noted that in some embodiments, the detector 113 may include a combination of two or more 3D detectors, such as a markerless system and a marker system, where the 3D data is determined by combining the outputs of both systems.

The processing elements 114, memory 116, and networking interface 118 can be encompassed in one or more computers, servers, or other electronic devices (shown in dashed lines in FIG. 2). In a specific embodiment, two or more desktop computers along with corresponding software and rendering engines are used. Additionally, each element can be comprised of two or more elements, e.g., a first processing element can be configured to process image data from the camera and a second processing element can be configured to process the projection content.

The memory 112 may store data or content, such as, but not limited to, audio files, video files, document files, and so on, corresponding to various theatrical presentations or shows. The memory 112 may be, for example, magneto-optical storage, read only memory, random access memory, erasable programmable memory, flash memory, or a combination of one or more types of memory components. As with the processing elements, the memory 112 can be shared between one or more devices and/or each component may have its own memory.

The input interface 118 provides a communication mechanism for the projection system 100 to other devices, such as other computing devices, stage lighting, or the like, as well as between components within the system 100. For example, the interface may include a wired, wireless, or combination of the two. Additionally, the camera 112 and 3D detector 113 each have interfaces that provide data communication to and from one another and the other devices in the system 100.

With reference to FIGS. 1A and 1B, the system 100 may also include one or more contrast enhancers 109. For example, one or more lighting elements can be used to illuminate the background scenic elements or the performer 102 to allow either to be more easily removed from the detected data. In a specific example, the contrast enhancers 109 are one or more infrared lights (IR) that flood the background of the performance area 106 with IR light wavelengths which are invisible to audience members, but detectable by the camera 112. The performer 102 will then block the reflected IR light beams, making it easier for the camera 112 to detect the data corresponding to the performer 102 as opposed to other elements in the scene. As another example, the contrast enhancers 109 can be one or more an ultra violet (UV) lights that uses UV wavelengths to illuminate select elements in the scene or the performer 102 to provide additional contrast for the camera 112 to detect without affecting the scene as viewed by audience members. In either of these examples, the performer 102, rather than the background, can be directly illuminated to provide the enhanced contrast for the camera 112. As another example, the foreground can be flooded by select wavelengths by the contrast enhancers 109.

In embodiments utilizing information detection enhancement elements, the elements may be selected so that they are invisible or otherwise hidden from any audience or viewers. For example, with the IR light embodiment, humans cannot perceive IR wavelengths and so although the camera 112 can detect and use these to assist in the information detection, the audience does not perceive lighting changes. Other types of information detection enhancers can also be used, such as, but not limited to, specific costume materials, colors for the performer or the stage, and so on.

The various elements of the system 100 are used to communicate data between one another and render various images of content that can be displayed on the performer or other projection surface. Often, the projector 110 and camera 112 will be calibrated such that the 2D information and image projection calculations will match as closely as possible the physical projection area and stage. The conventional calibration techniques can be used to calibrate the two devices.

Figure 3:
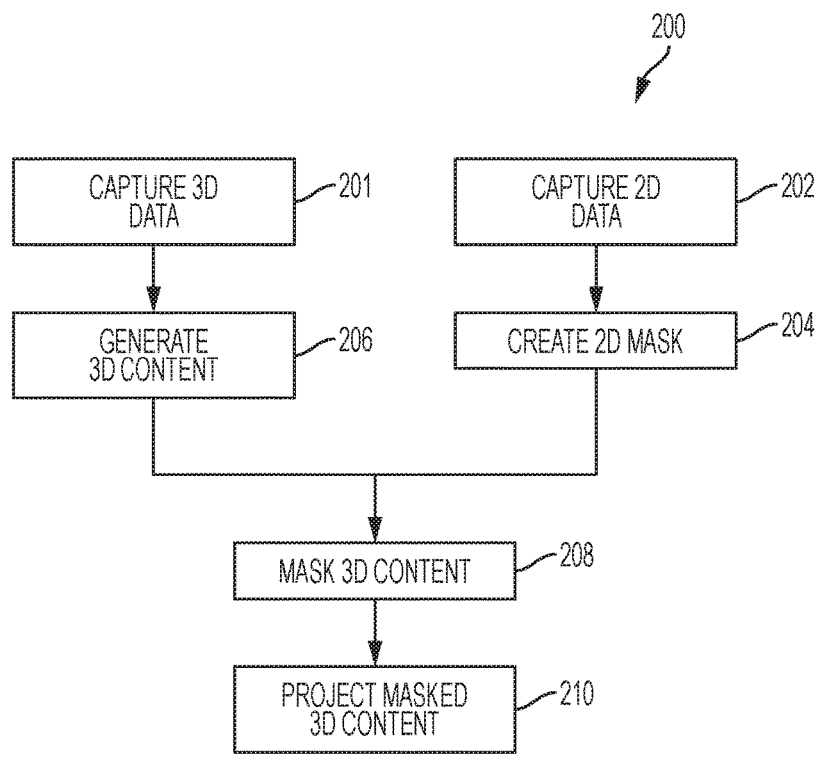
FIG. 3 is a method for utilizing the system of FIG. 1B to project content onto the performer.

FIG. 3 is a flow chart illustrating a method 200 for using the projection system 100 to display content onto one or more performers 102. The method 200 includes operations 201 and 202 that are typically performed simultaneously. In operation 201, the 3D detector 113 captures 3D information, such as the depth, orientation, and position of the performer 102. In operation 202, the camera 112 captures the 2D information of the scene that includes the location and a 2D representation of the performer 102.

In embodiments where the camera 112 and the 3D detector 113 are integrated into a single component, the operations 201, 202 can be performed by the same device. However, in embodiments where the camera 112 and the 3D detector 113 are separate components, the operations 201, 202 may be performed by each of the two components. The 2D and 3D information can then be transmitted to the one or more processing elements 114, such processors within one more computers.

Figure 4:
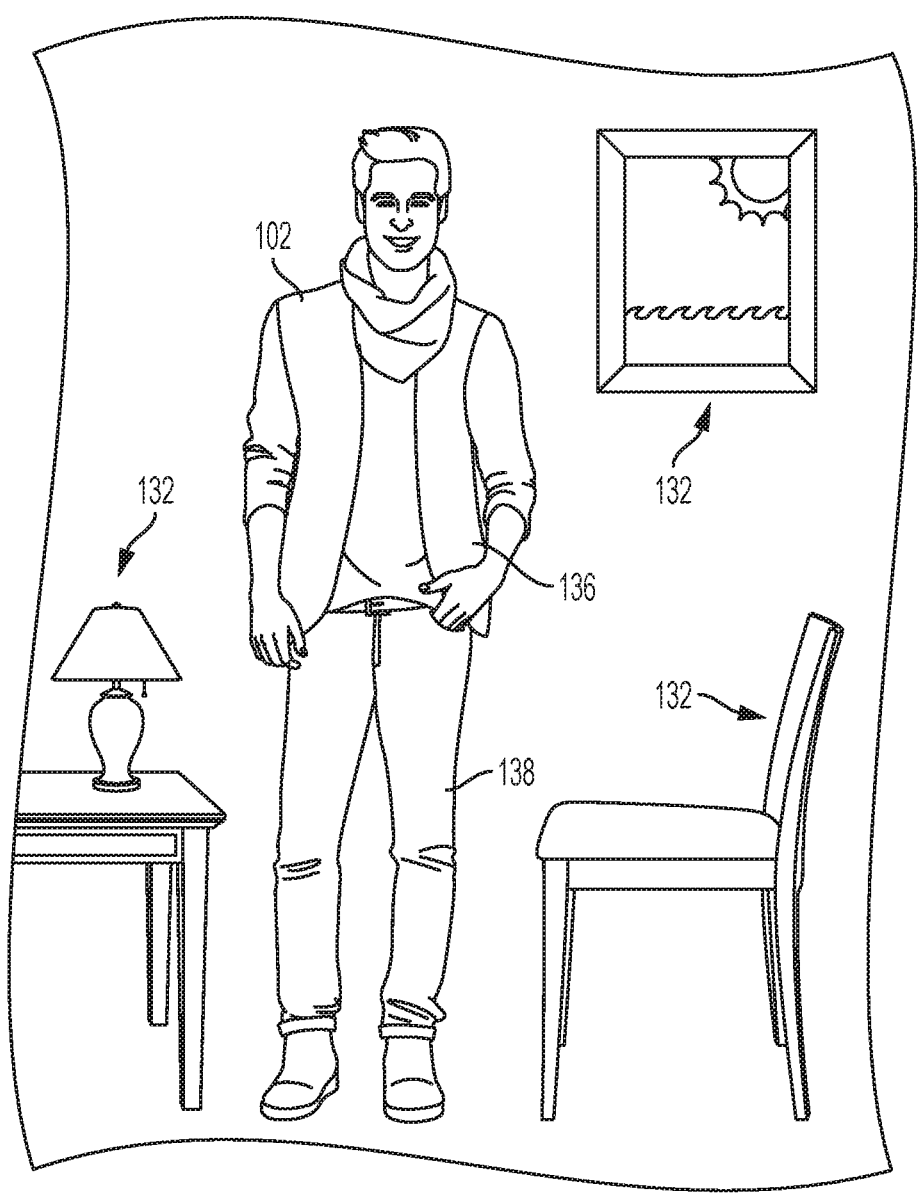
FIG. 4 is an image of the performer in the performance area of FIG. 1A before the content is projected by the system.

Using the 2D data, in operation 204 a 2D mask (illustrated as mask 13 in FIG. 5A) is generated. For example, the processing element 114 uses a pixel subtraction method to remove background information 132, such as pixels corresponding to the performance area 106, scenic elements, or the like, shown in FIG. 4 such that the only data remaining in the image is the mask 130 corresponding to the silhouette of the performer. As the mask forms a boundary for the content, the mask represents as a silhouette of the performer and the information used for the mask may just be the orientation and/or location of the performer 102 in the performance area 106. The mask 130 is a 2D representation of the orientation and location of the performer 102 and defines the perimeter of the performer 102. In embodiments where the information detection element 109 is an IR background light, the performer 102 can appear as black or gray pixels in the captured image and the processing element can use an intensity threshold algorithm to remove all the pixels above or below a set threshold to create the mask 130. It should be noted that the mask 130 may not be physically rendered, but a mathematical operation and the discussion of any particular appearance of the mask is meant as illustrative only.

Figure 5A:
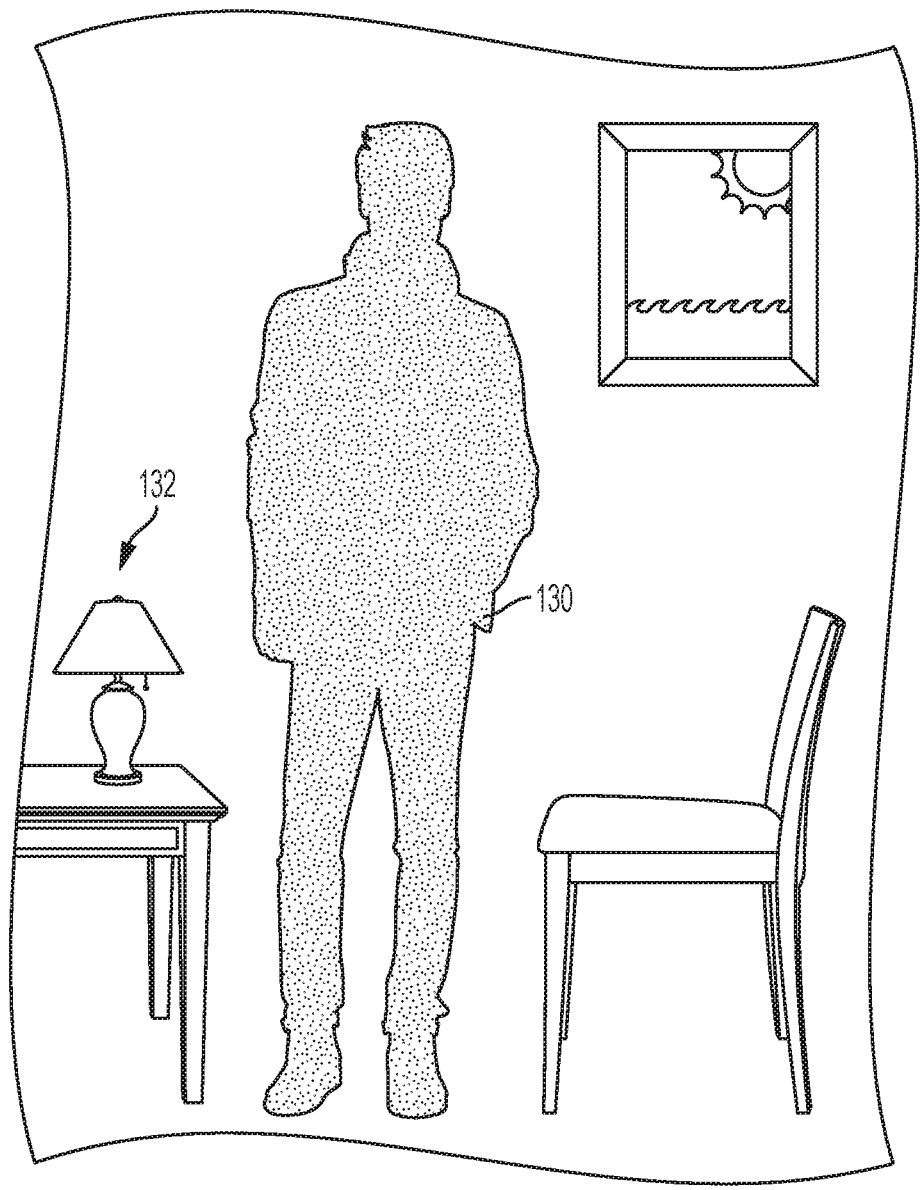
FIG. 5A illustrates a first example of a mask used to modify the content for projection onto the performer.
Figure 5B:
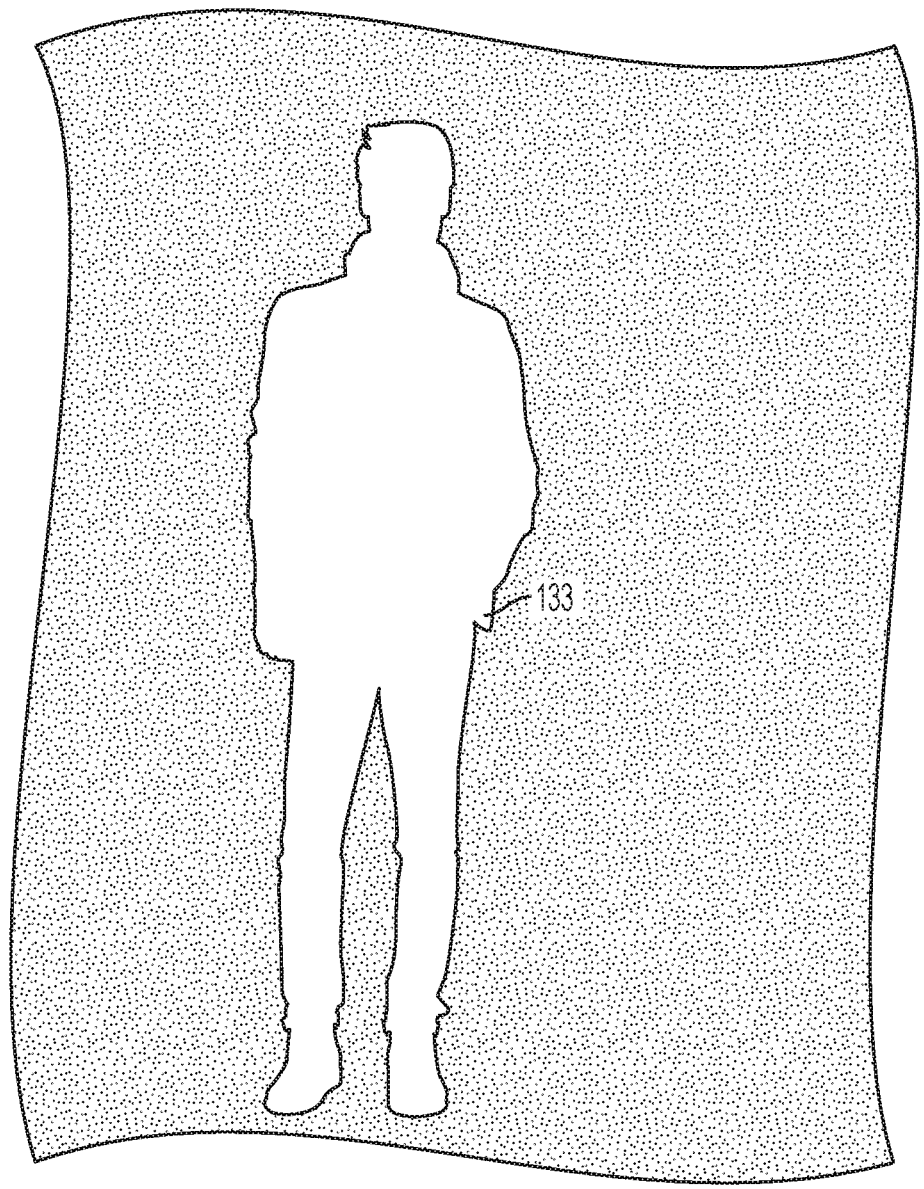
FIG. 5B illustrates a second example of a mask used to modify the content for projection onto the performer.

The processing element 114 may use other techniques such as foregoing intensity subtraction, computer vision techniques for tracking a pattern or other indicator of the performer 102, volume captured, scene carving, or the like to create the mask 130. Examples of different types of masks are shown in FIGS. 5A and 5B (discussed below).

Returning to FIG. 3, as the mask is being created, in operation 206, the 3D content is generated. The 3D content may be substantially any type of content that can be projected onto the performer 102, such as, but not limited to; real time generated 3D content, textures, images, structured light patterns, and so on. In this operation 206, the content may be pre-created (such as a predetermined image or sequence of images) and is modified based on the 3D position information of the performer 102. For example, if the content is an image that extends around the body of the performer 102, the content is modified to adjust based on the orientation of the performer, e.g., warped, adjusted, or the like.

Method 300 proceeds to operation 208 and the 3D content is masked. The mask 130 is then layered over (e.g., mathematically applied to) the content to set a projection boundary for the content on the projection area. For example, the mask 130 is used to determine a boundary of the 3D content such that the projection of the 3D content will be limited by the mask 130 to prevent blow-by (i.e., light that misses the performer 102 and instead makes distracting lighting on the background objects and set pieces). In instances where the mask 130 is a positive one, the mask 130 will prevent the 3D content from being projected outside of its boundaries, i.e., the content can only be projected within the boundaries of the mask 130. In instances where the mask 130 is a negative mask, the mask 130 will prevent the content from being projected within the mask, i.e., the content can be only projected outside of the boundaries of the mask. In either example, the mask 130 sets a 2D perimeter for the 3D content.

In some embodiments, the mask 130 may be used to affect the rendering of the content. For example, the processing element uses the mask 130 to determine which pixels of the content to render and which pixels to omit. Pixels that would be rendered off performer 102, for example, need not be rendered. This not only increases the perceived accuracy of the projected content onto the desired projection area, but also increases the speed that the content can be rendered as certain pixels are omitted, further decreasing the latency of the system 100.

As a specific example, of a technique for modifying the 3D data with the 2D mask, the 3D data is co-located with a 3D representation of the stage and the performer 102 and the 3D data is aligned with the performer 102 in the 3D space.

Using a virtual camera, having the same lens properties, location, etc. as the camera 112, the 2D mask 130 matches with the 3D position of the performer 102 and allows the mask 130 to be used to determine the boundaries of the performer 102 for rendering the content.

Once or as the 3D content is masked by the mask 130, the method 200 proceeds to operation 210. In operation 210 the projector 110 projects the masked 3D content onto the performer 102 and projection area 106. In some embodiments the 3D content is aligned within a 3D representation of the stage to enhance the alignment of the content with a desired area of the projection area 106 and performer 102.

As noted above, examples of the mask 130 include positive and negative masks. FIG. 5A illustrates a positive mask 130 is where mask defines the silhouette of the performer 102. In other embodiments, the mask is a negative mask and defines items in the background that are not the performer (where the performer can be defined by the white or void spaces). FIG. 5B illustrates an example of a negative mask 133 that can be used to define a projection are onto the performer 102. The type of mask 130 is variable based on the system 100, the type of projection and content used, as well as the performer 102, the costumes, and the scenic elements. As shown in FIGS. 5A and 5B the mask 130 sets a boundary for defining the perimeter (e.g., silhouette) of the performer 102. It should be noted that although the masks 130, 133 are illustrated as the 2D area image of the performer 102 in some embodiments the masks 130, 133 correspond to only portions of the performer 102, e.g., the legs, arm, torso, head, shoes, etc. Similarly, with multiple projectors, multiple masks can be used such that one projector projects content onto the performer's shoes via a shoe mask and another projector projects content onto the performer's torso using a mask that sets the boundary for the torso content.

Figure 6A:
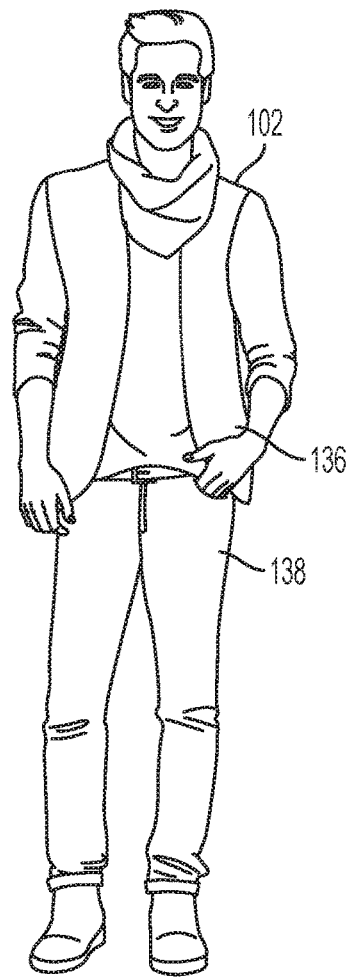
FIG. 6A illustrates an image of the performer of FIG. 4.
Figure 6B:
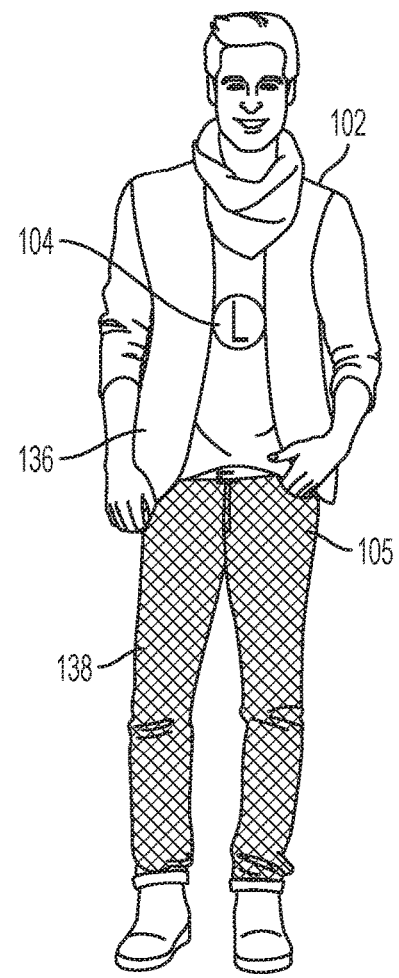
FIG. 6B illustrates an image of the performer of FIG. 4 with the content being projected thereon.

FIG. 6A illustrates the performer 102 before the content is projected and FIG. 6B illustrates the performer 102 after the content is projected. As shown in FIG. 6B, two types of content 104, 105 are projected onto various sections of the performer 102. The content may be modified and projected onto the performer 102 in portions (e.g., torso content and lower limbs content) or may be projected as a single image onto the performer 102. In either projection method, one or more masks may be used to bind the content to ensure that the content does not spill over onto other areas of the stage, etc.

Figure 7A:
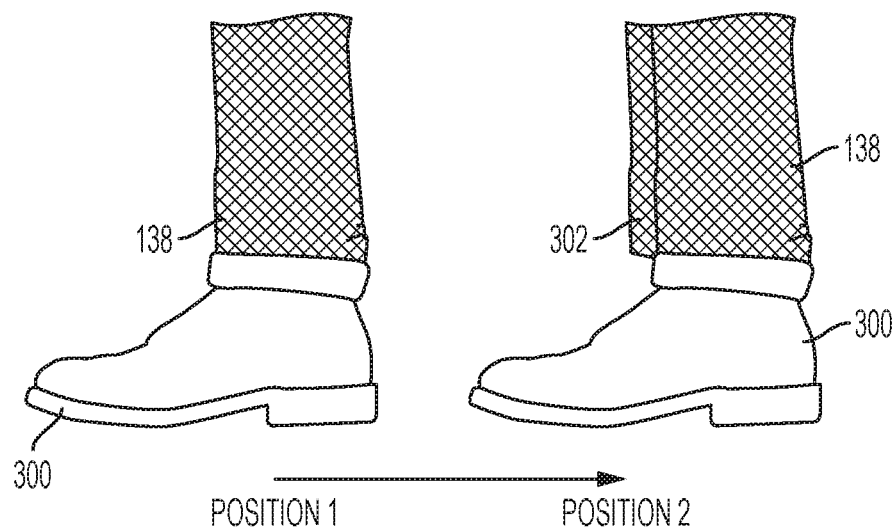
FIG. 7A illustrates an image of unmasked content projected onto a portion of the performer as the performer moves from a first position to a second position.
Figure 7B:
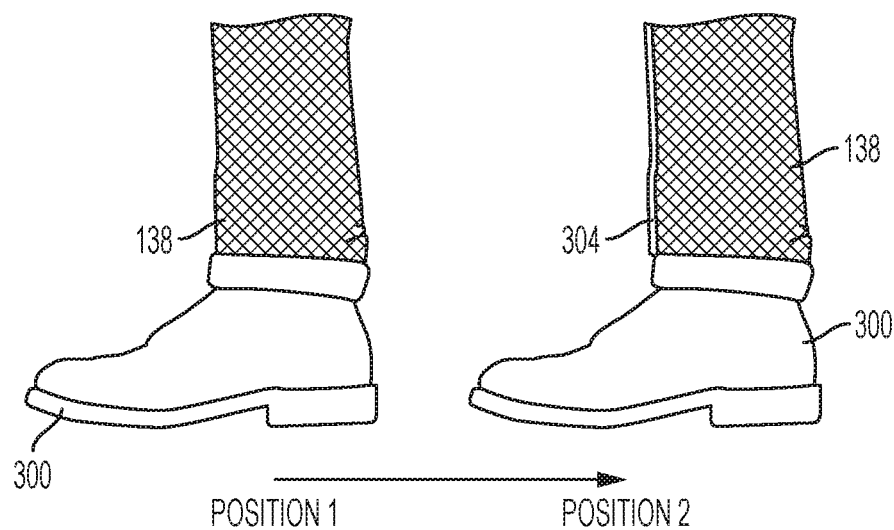
FIG. 7B illustrates an image of masked content projected onto a portion of the performer as the performer moves from a first position to a second position.

FIG. 7A illustrates an example of content projection by an unmasked projection system. With reference to FIG. 7A, the leg 300 of the performer includes content 138 projected thereon. When in the first position, the content 138 is projected solely on the leg 300. However, as the performer 102 moves the leg 300 from the first position to the second position, the 3D tracking information is slower than the projection and the content 138 includes portions 302 that are projected off of the leg 300. The portions 302 will be displayed on background elements and illustrate the blow-by that can happen without a masked system. These portions 302 reduce the realistic and artistic effects desired. Using the system 100, the content 138 is masked to eliminate the blow-by effects. FIG. 7B illustrate the leg 300 as it moves from the first position to the second position. As shown in FIG. 7B, the 2D mask helps to define an edge 304 for the content, preventing the content from being rendered past the perimeter of the leg 300. The width of the edge 304 depends on the accuracy of the 2D data and often will be sufficiently small to be imperceptible to a viewer. The mask 2D eliminates the content from being projected past the boundary of the performer 102 or other desired projection region, and thus reduces the effects of the 3D tracking latency, especially for quick movements by the performer 102.

Figure 8:
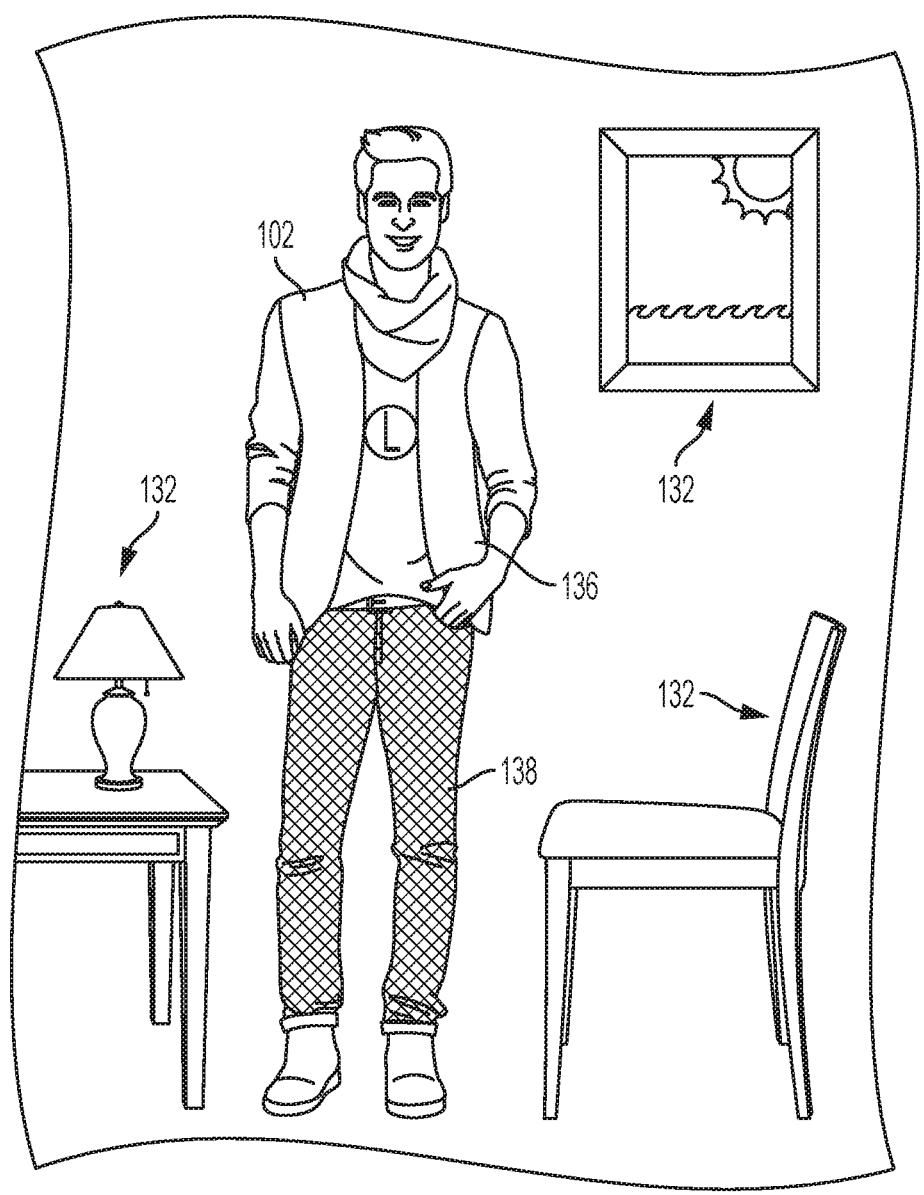
FIG. 8 is an image of the performer in the performance area of FIG. 1A with the content being projected onto the performer.

FIG. 8 illustrates the performer 102 in the projection area 106 with the content being projected thereon. As shown in FIG. 8, the content 104, 105 is projected directly onto the performer 102 and does not spill over onto the other areas of the scene, such as the background elements 132. This projection and boundaries of the content are maintained, even as the performer 102 moves to different locations in the projection area 106 (e.g., across the stage) and as the performer 102 moves in different orientations (e.g., moves his or her legs, arms, etc.). This allows the content to appear more realistically on the performer 102 and fused with the performer 102. Also, the content will move with and adhere to the performer 102 and change based on changes in the orientation of the performer 102.

In particular, as the 3D position and movement information input to the system 100 continues to update as the performer 102 moves such that the content will move with the performer 102. Additionally, because the mask 130 is 2D it can be generated very quickly, especially as compared to the 3D content modification, which allows the processing elements 114 to keep up with the dynamic movements of the performer 102. The mask 130 makes up for the lag in the 3D content generation by hiding or concealing any latency errors in the 3D content generation by excluding the content from being projected onto unwanted areas. In other words, the mask 130 assists in improving the perceived accuracy of the projected content, without hindering or slowing the processing or generation of the content. In one embodiment, the latency of the system 100 is 6 milliseconds, which is sufficiently small so that most movements by the performer 102 are adequately tracked by the projected content and the audience may not perceive any errors due to latency.

Using the system 100 and method 200, content can be projected onto and/or around a performer 102, even as the performer dynamically moves within a projection area 106. Conventional systems for content projection typically do not include 3D content that changes based on the orientation of the performer 102, as the latency introduced to modify the content as the performer's orientation and position changed was visible and caused "blow by" artifacts where the content was not projected solely onto the performer, e.g., leaked onto stage, scenic elements, or the like. Additionally, in instances where content is projected onto a performer 102, conventional methods require completely accurate alignment between the projected content and the performer 102, or other projected surface, and therefore is prone to very small calculation or detection errors, movement by the performer, and so on.

In one embodiment, the system 100 and method 200 detected the orientation of the performer 102 and projected the modified content at 480 Hertz, which is substantially faster than conventional systems and allows the use of 3D content tracking, which was not previously possible with the conventional systems. In some embodiments, additional elements can be used to further increase the processing and/or projection speed, as well as enhance the projection accuracy. For example, the 3D tracking may include intelligent prediction of the motion of the performer to predict the performer's movements, which will decrease the latency of the 3D tracking, increasing the speed of the overall projection and the accuracy. In one embodiment, a Kalman filter can be used in conjunction with a Vicom 3D tracking system to speed up the 3D information of the performer.

CONCLUSION

In methodologies directly or indirectly set forth herein, various steps and operations are described in one possible order of operation but those skilled in the art will recognize the steps and operation may be rearranged, replaced or eliminated without necessarily departing from the spirit and scope of the present disclosure. It is intended that all matter contained in the above description or shown in the accompanying drawings shall be interpreted as illustrative only and not limiting. Changes in detail or structure may be made without departing from the spirit of the disclosure as defined in the appended claims.

What is claimed is:

1. A method for modifying content projected onto a moving performer, the method comprising:
   receiving by one or more processing elements an original content image;
   receiving by one or more processing elements two dimensional positional data and three dimensional positional data corresponding to the performer, wherein the three dimensional positional data is directly received by tracking motion of the moving performer;
   utilizing by the one or more processing elements the two-dimensional positional data to generate a mask corresponding to a representation of the performer;
   utilizing by the one or more processing elements the three-dimensional positional data to generate a modified three-dimensional content image;
   constraining by one or more processing elements the modified three-dimensional content image by the mask to generate a masked output image, wherein the masked output image has a projection area that is different from a projection area of the modified three-dimensional content; and
   projecting the masked output image onto the moving performer.

2. The method of claim 1, further comprising transmitting the masked content image to a projector for projecting onto the moving performer, wherein the masked content image is produced by the modified three-dimensional content image overlaid by the mask.

3. A method for projecting content onto a performer, comprising:
   receiving by a processing element detected two-dimensional data corresponding to a two-dimensional representation of the performer within a location;
   receiving by the processing element from a three-dimensional sensor, a detected three-dimensional position of the performer within the location, wherein the three-dimensional position sensor directly tracks the performer;
   generating by a processing element a mask based on the received two-dimensional data, wherein the mask corresponds to the two-dimensional representation of the performer;
   rendering three dimensional content by the processing element, wherein the three dimensional content is based on the detected three dimensional position of the performer, such that the three-dimensional content is rendered to match the detected three-dimensional position of the performer and has a content boundary;
   applying the mask to the rendered three dimensional content to set a projection boundary of the three dimensional content, wherein the projection boundary is different from the content boundary; and
   projecting by a projector the masked three dimensional content onto the performer, wherein the masked three dimensional content is projected within the projection boundary and three dimensional content falling within the content boundary but falling outside of the projection boundary is not projected.

4. The method of claim 3, further comprising modifying by the processing element an input content based on the three dimensional position of the projector.

5. The method of claim 3, wherein the mask is one of a positive mask or a negative mask.

6. The method of claim 3, further comprising receiving performer data corresponding to a depth, location, and orientation of the performer.

7. A projection system for projecting content onto a performer, the system comprising:
   a projector for projecting light onto the performer;
   a camera for capturing a two-dimensional image of the performer;
   a three dimensional position sensor for capturing three dimensional position information of the performer; and
   a computer in electronic communication with the projector, the camera, and the position sensor, wherein the computer is configured to perform the following operations:
      receive initial content for projection onto the performer;
      generate a silhouette of the performer based on the two-dimensional image of the performer;
      generate an updated content based on the captured three dimensional position information of the performer;
      setting a two dimensional perimeter of the updated content based on the silhouette of the performer to generate a modified content; and
      provide the modified content to the projector for projection onto the performer;
   and wherein the projector projects the modified content onto the performer.

8. The projection system of claim 7, wherein the updated content is adjusted to correspond to a depth position of the performer.

9. The projection system of claim 7, wherein the silhouette is a two dimensional silhouette of the performer.

10. The projection system of claim 7, wherein the computer comprises a first computer and a second computer, wherein the first computer and the second computer are in electronic communication with one another, the first computer is in electronic communication with the projector, and the second computer is in electronic communication with the camera.

11. The projection system of 13, wherein to modify the initial content based on the silhouette of the performer, the computer constrains a projection area of the initial content to the silhouette of the performer.

12. The projection system of claim 7, wherein the projector projects the modified content onto the performer as the performer moves dynamically across a stage or performance area.

13. The method of claim 1, wherein constraining the modified three-dimensional content image by the mask to generate the masked output image comprises:
   layering the mask over the modified three-dimensional content to set a projection boundary for the modified three-dimensional content.

14. The method of claim 1, wherein the two dimensional positional data comprises a captured image of the performer within a scene; and utilizing the two-dimensional positional data to generate the mask corresponding to a representation of the performer comprises removing background information of the scene within the captured image such that a modified captured image includes a silhouette of the moving performer defining the mask corresponding to the representation of the performer.

15. The method of claim 1, wherein constraining the modified three-dimensional content image by the mask to generate the masked output image comprises selecting portions of the modified three-dimensional content falling within a perimeter defined by the mask as the masked output image for projection so as to conceal latency errors that occur during generation of the modified three-dimensional content.

16. The system of claim 7, wherein setting the two-dimensional perimeter comprises determining sections of the updated content that are within the silhouette of the performer as the modified content for projection and not projecting sections of the updated content not within the silhouette of the performer.

17. The system of claim 7, wherein the updated content comprises a content perimeter, wherein the content perimeter includes updated content not encompassed by the two-dimensional perimeter.

18. The method of claim 3, wherein the masked three-dimensional content hides latency introduced during generation of the three-dimensional content.

* * * * *